(12) United States Patent
Seike

(10) Patent No.: US 9,943,984 B2
(45) Date of Patent: Apr. 17, 2018

(54) INJECTION MOLDING MACHINE

(71) Applicant: SUMITOMO HEAVY INDUSTRIES, LTD., Tokyo (JP)

(72) Inventor: Kouji Seike, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/628,368

(22) Filed: Feb. 23, 2015

(65) Prior Publication Data

US 2015/0246462 A1 Sep. 3, 2015

(30) Foreign Application Priority Data

Feb. 28, 2014 (JP) .................................. 2014-039715

(51) Int. Cl.
*B29B 7/38* (2006.01)
*B29C 45/77* (2006.01)
*B29C 45/54* (2006.01)

(52) U.S. Cl.
CPC ............... *B29B 7/38* (2013.01); *B29C 45/77* (2013.01); *B29C 2045/548* (2013.01); *B29C 2945/76006* (2013.01); *B29C 2945/7612* (2013.01); *B29C 2945/76113* (2013.01); *B29C 2945/76187* (2013.01); *B29C 2945/76197* (2013.01);
(Continued)

(58) Field of Classification Search
CPC .......... B29C 2945/76381; B29C 2945/76946; B29C 2945/76675; B29C 2945/76384; B29C 2945/76943; B29C 2945/76197; B29C 2945/76367; B29C 2945/7612; B29C 45/77; B29C 2945/76187; B29C 2945/76113; B29C 2945/76006;
(Continued)

(56) References Cited

U.S. PATENT DOCUMENTS 3,904,078 A * 9/1975 Neff .................. B29C 45/77
222/1
4,632,651 A * 12/1986 Von .................. B29C 45/54
264/40.3
(Continued)

FOREIGN PATENT DOCUMENTS

EP 0965431 12/1999
EP 2002960 12/2008
(Continued)

*Primary Examiner* — Alison L Hindenlang
*Assistant Examiner* — Jerzi H Moreno Hernandez
(74) *Attorney, Agent, or Firm* — IPUSA, PLLC

(57) ABSTRACT

An injection molding machine includes a cylinder; a screw; a rotary driving unit; a reciprocation driving unit; a pressure detector that detects a pressure of a molding material in front of the screw; a control unit that performs a first type of plasticizing process where the screw is moved backward to a predetermined position and rotated at the predetermined position to transfer the molding material forward to reserve the molding material in front of the screw, performs a first type of filling process where the screw is moved forward to inject the molding material reserved in front of the screw in the first type of plasticizing process from the cylinder to be filled in a mold unit, monitors the pressure in the first type of filling process by the pressure detector, and corrects the setting of the first type of filling process based on a monitored result.

7 Claims, 2 Drawing Sheets

(52) U.S. Cl.
CPC ............... *B29C 2945/76367* (2013.01); *B29C 2945/76381* (2013.01); *B29C 2945/76384* (2013.01); *B29C 2945/76498* (2013.01); *B29C 2945/76675* (2013.01); *B29C 2945/76936* (2013.01); *B29C 2945/76943* (2013.01); *B29C 2945/76946* (2013.01)

(58) Field of Classification Search
CPC ........... B29C 2945/76498; B29C 2945/76936; B29B 7/38
See application file for complete search history.

(56) References Cited

U.S. PATENT DOCUMENTS

| | | | |
|---|---|---|---|
| 5,738,809 A | 4/1998 | Hara et al. | |
| 5,792,483 A * | 8/1998 | Siegrist | B29C 45/5008 425/135 |
| 6,325,954 B1 * | 12/2001 | Sasaki | B29C 45/76 264/328.1 |
| 2004/0091561 A1 * | 5/2004 | Uchiyama | B29C 45/76 425/145 |
| 2004/0096534 A1 * | 5/2004 | Shiraishi | B29C 45/76 425/159 |
| 2005/0019441 A1 * | 1/2005 | Seta | B29C 45/54 425/145 |
| 2005/0161847 A1 * | 7/2005 | Weatherall | B29C 45/77 264/40.1 |
| 2006/0191347 A1 * | 8/2006 | Uchiyama | B29C 45/768 73/714 |
| 2007/0296102 A1 * | 12/2007 | Hofmann | B29C 45/77 264/40.1 |
| 2008/0088048 A1 * | 4/2008 | Hayakawa | B29C 45/67 264/40.5 |
| 2008/0099943 A1 * | 5/2008 | Yamagiwa | B29B 17/00 264/40.5 |
| 2008/0199551 A1 * | 8/2008 | Maruyama | B29C 45/52 425/145 |
| 2010/0034913 A1 * | 2/2010 | Grunitz | B29C 45/5008 425/146 |
| 2013/0095199 A1 * | 4/2013 | Maruyama | B29C 45/50 425/146 |
| 2014/0248386 A1 * | 9/2014 | Oono | B29C 45/77 425/146 |

FOREIGN PATENT DOCUMENTS

| | | | |
|---|---|---|---|
| JP | H05-212762 | | 8/1993 |
| JP | H07-112463 | | 5/1995 |
| JP | 07214615 A | * | 8/1995 |
| JP | H08-034040 | | 2/1996 |
| JP | H08-197596 | | 8/1996 |
| JP | H11-019987 | | 1/1999 |
| JP | 2001-191374 | | 7/2001 |
| JP | 2011-183705 | | 9/2011 |

* cited by examiner

INJECTION MOLDING MACHINE

CROSS-REFERENCE TO RELATED APPLICATION

The present application is based on and claims the benefit of priority of Japanese Priority Application No. 2014-039715 filed on Feb. 28, 2014, the entire contents of which are hereby incorporated by reference.

BACKGROUND OF THE INVENTION

1. Field of the Invention

The present invention relates to an injection molding machine.

2. Description of the Related Art

An injection molding machine includes a cylinder that heats a molding material and a screw rotatably and reciprocatably provided in the cylinder. In a plasticizing process, the screw is rotated and the molding material is transferred toward in front of the screw. The molding material is gradually melted while being transferred forward. While the liquid molding material is being accumulated in front of the screw, the screw is moved backward by the pressure of the molding material in front of the screw. Thereafter, in a filling process, the screw is moved forward to inject the molding material reserved in front of the screw from the cylinder to be filled in a mold unit. The filled molding material is solidified to obtain a molding product in a cooling process. The molding product is exerted from the mold unit after a mold opening process. Generally, the plasticizing process is performed while the cooling process is being performed.

SUMMARY OF THE INVENTION

According to an embodiment, there is provided an injection molding machine including a cylinder that heats a molding material; a screw that is rotatably and reciprocatably provided in the cylinder; a rotary driving unit that rotates the screw; a reciprocation driving unit that reciprocates the screw; a pressure detector that detects a pressure of the molding material reserved in front of the screw; a control unit that controls the rotary driving unit and the reciprocation driving unit, the control unit performing a first type of plasticizing process in which the screw is moved backward to a predetermined position and the screw is rotated at the predetermined position to transfer the molding material forward to reserve the molding material in front of the screw, performing a first type of filling process in which the screw is moved forward to inject the molding material reserved in front of the screw in the first type of plasticizing process from the cylinder to be filled in a mold unit, monitoring the pressure in the first type of filling process by the pressure detector, and correcting a setting of the first type of filling process based on a monitored result.

Note that also arbitrary combinations of the above-described elements, and any changes of expressions in the present invention, made among methods, devices, systems and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

DETAILED DESCRIPTION OF THE PREFERRED EMBODIMENTS

Figure 1:
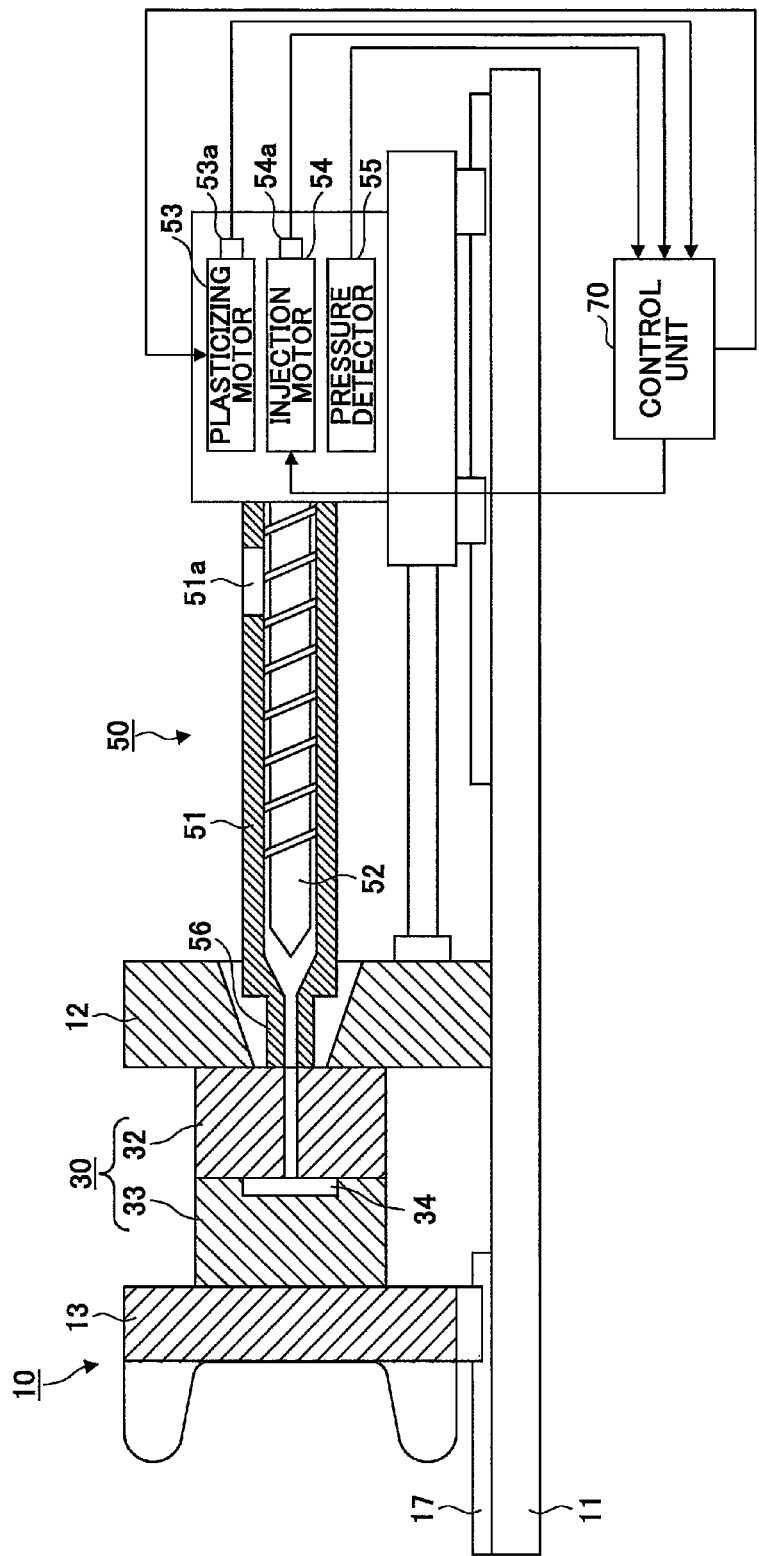
FIG. 1 is a view illustrating an example of an injection molding machine of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

When the period necessary for the plasticizing process is longer than the period necessary for the cooling process, the mold opening process is performed after the completion of the plasticizing process. On the other hand, by starting the mold opening process while the plasticizing process is being performed, the molding cycle can be shortened. However, in order to perform the mold opening process while the plasticizing process is being performed, an open and closing mechanism that opens and closes an exit of the cylinder is necessary.

It is desirable to provide an injection molding machine capable of performing a plasticizing process at a mold open state by means other than an open and closing mechanism that opens and closes an exit of a cylinder.

FIG. 1 is a view illustrating an example of an injection molding machine of the embodiment. As illustrated in FIG. 1, for example, the injection molding machine includes a mold clamping unit 10, an injection unit 50 and a control unit 70.

The mold clamping unit 10 performs a mold closing process, a mold clamping process and a mold opening process of the mold unit 30. As illustrated in FIG. 1, for example, the mold clamping unit 10 includes a frame 11, a stationary platen 12 and a movable platen 13. The mold unit 30 includes a stationary mold 32 and a movable mold 33, for example.

The stationary platen 12 is fixed to the frame 11. The stationary mold 32 is attached to a surface of the stationary platen 12 that is facing the movable platen 13.

The movable platen 13 is movable along a guide (a guide rail, for example) 17 that is provided on the frame 11. The movable mold 33 is attached to a surface of the movable platen 13 that is facing the stationary platen 12.

The mold closing process, the mold clamping process and the mold opening process are performed by moving the movable platen 13 with respect to the stationary platen 12. A cavity 34 is formed between the stationary mold 32 and the movable mold 33 at a clamped mold state.

The injection unit 50 fills a molding material (resin, for example) in the mold unit 30. As illustrated in FIG. 1, for example, the injection unit 50 includes a cylinder 51, a screw 52, a plasticizing motor 53, an injection motor 54 and a pressure detector 55.

The cylinder 51 heats the molding material. The cylinder 51 is provided with a feeding port 51a for introducing the molding material into the cylinder 51 at a rear portion of the cylinder 51. A heating source such as a heater or the like is provided at an outer periphery of the cylinder 51. The cylinder 51 is provided with a nozzle 56 at its front end.

The screw 52 is rotatably and reciprocatably provided in the cylinder 51. When the screw 52 is rotated, the molding material is transferred forward along a helicoid groove of the screw 52. While being moved forward, the molding material is gradually melted. Then, the liquid molding material is reserved in front of the screw 52. Thereafter, when the screw 52 is moved forward, the molding material reserved in front of the screw 52 is injected from the nozzle 56 and filled in the cavity 34 of the mold unit 30.

The plasticizing motor 53 is a rotary driving unit that rotates the screw 52. The plasticizing motor 53 may include an encoder 53*a*. The encoder 53*a* detects a revolution speed of the screw 52 by detecting a revolution speed of the plasticizing motor 53 and outputs a signal indicating the revolution speed of the screw 52 to the control unit 70.

The injection motor 54 is a reciprocation driving unit that reciprocates, moves backward and forward, the screw 52. There is provided a motion converting unit (not illustrated in the drawings) that converts a rotational motion of the injection motor 54 to a linear motion of the screw 52 between the screw 52 and the injection motor 54. The injection motor 54 may include an encoder 54*a*. The encoder 54*a* detects a speed of the screw 52 in a forward direction by detecting a revolution speed of the injection motor 54, and outputs a signal indicating the speed of the screw 52 to the control unit 70.

The pressure detector 55 detects the pressure of the molding material reserved in front of the screw 52 by detecting a back pressure of the screw 52, and outputs a signal indicating the pressure of the molding material to the control unit 70. Here, although the pressure detector 55 is provided at back of the screw 52 in this embodiment, the position of the pressure detector 55 is not specifically limited. For example, the pressure detector 55 may be provided in the cylinder 51.

The control unit 70 controls the mold clamping unit 10 and the injection unit 50. The control unit 70 includes a storing unit such as a memory or the like and a central processing unit (CPU). The control unit 70 controls the mold clamping unit 10 and the injection unit 50 by having the CPU execute a control program stored in the storing unit.

Figure 2:
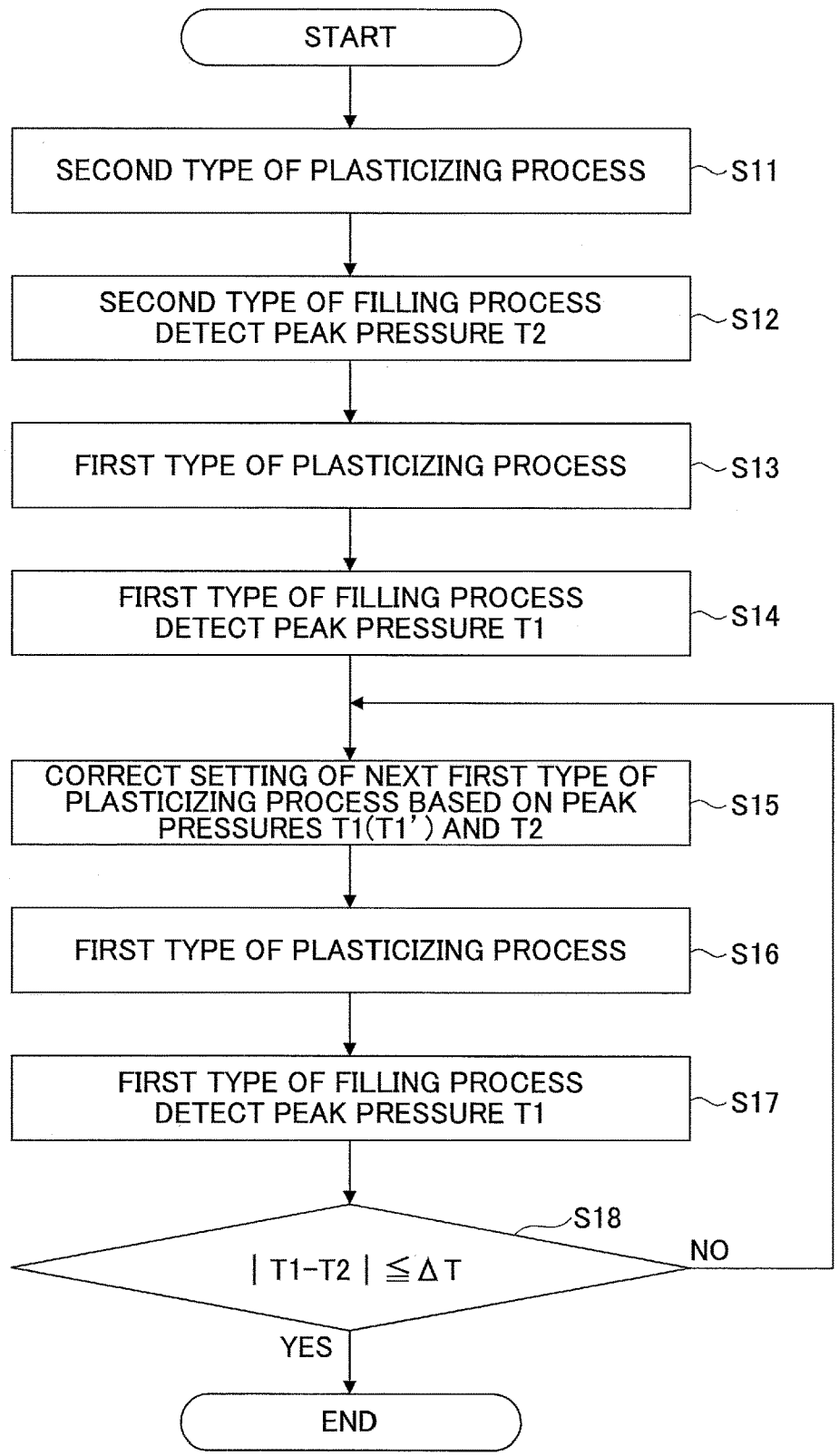
FIG. 2 is a view illustrating an example of a method of controlling the injection molding machine of the embodiment.

FIG. 2 is a view illustrating an example of a method of controlling the injection molding machine of the embodiment.

Before describing steps of FIG. 2, a molding process is explained. In general, the molding process includes a filling process, a hold pressure process, a cooling process, a mold opening process, an exerting process, a mold closing process and a mold clamping process performed in this order.

First, a molding material is filled in the mold unit 30 in the filling process. Then, the pressure is applied to the molding material in the mold unit 30 in the hold pressure process. Thereafter, the molding material filled in the mold unit 30 is solidified in the cooling process. Then, the mold unit 30 is opened in the mold opening process. Thereafter, after exerting a molding product in the exerting process, the mold unit 30 is closed in the mold closing process. Then, the mold unit 30 is clamped in the mold clamping process.

Referring to FIG. 2, in step S11, a second type of plasticizing process is performed. The control unit 70 controls the second type of plasticizing process. The second type of plasticizing process is performed while the cooling process for a molding product of a previous shot is being performed. Then, after the second type of plasticizing process is completed, the mold opening process is performed and the molding product of the previous shot is exerted from the mold unit 30. In other words, the mold unit 30 is not opened until the second type of plasticizing process is finished.

In the second type of plasticizing process, the control unit 70 operates the plasticizing motor 53 to rotate the screw 52. With this operation, the molding material is transferred forward. The molding material is gradually melted while being transferred forward. As the liquid molding material is accumulated in front of the screw 52, the screw 52 is moved backward due to the pressure caused by the liquid molding material in front of the screw 52.

In the second type of plasticizing process, the control unit 70 controls the plasticizing motor 53 such that the revolution speed of the screw 52 becomes a set value. The set value for the revolution speed of the screw 52 may be constant, or may be varied in accordance with a position of the screw 52 or in accordance with time period.

In the second type of plasticizing process, the control unit 70 may operate the injection motor 54 to apply back pressure to the screw 52 in order to limit a drastic movement of the screw 52 in the backward direction. The control unit 70 controls the injection motor 54 such that the back pressure of the screw 52 becomes a set value.

When the screw 52 is moved backward to a predetermined position and a predetermined amount of the molding material is reserved in front of the screw 52, the second type of plasticizing process is completed.

In step S12, a second type of filling process is performed. The control unit 70 controls the second type of filling process. In the second type of filling process, the control unit 70 operates the injection motor 54 to move the screw 52 forward and the molding material reserved in front of the screw 52 in the second type of plasticizing process is injected from the cylinder 51 to be filled in the mold unit 30. This means that the filling process is performed.

The control unit 70 controls the injection motor 54 such that the speed of the screw 52 in the forward direction becomes a set value in the second type of filling process. The set value for the speed of the screw 52 in the forward direction may be constant, or may be varied in accordance with a position of the screw 52 or in accordance with time period.

When the screw 52 is moved forward to a predetermined position (so-called a V/P switching position), the second type of filling process is finished and the hold pressure process is started. At the V/P switching position, control of the movement of the screw 52 is changed from velocity based control to pressure based control and this timing is referred to as V/P switching timing. Here, alternatively, the hold pressure process may be started when a predetermined period has passed after starting the filling process. In the hold pressure process, the pressure is applied to the molding material in the mold unit 30. Thus, the molding material can be further filled for an amount corresponding to a volumetric shrinkage of the molding material due to cooling of the molding material. In the hold pressure process, the injection motor 54 is controlled such that the pressure of the screw 52 becomes a set value.

The control unit 70 monitors the pressure of the molding material in front of the screw 52 by the pressure detector 55 in the second type of filling process (hereinafter, simply referred to as the "pressure in the second type of filling process") and stores the monitored result (peak pressure T2, for example) in the storing unit. Alternatively, the control unit 70 may store the pressure at the V/P switching timing instead of the peak pressure, and the data to be stored may be various kinds. The control unit 70 may repeatedly perform the second type of plasticizing process and the second type of filling process for a plurality of shots, and may store an average value of the pressures of the plurality of shots in the storing unit.

In step S13, a first type of plasticizing process is performed. The control unit 70 controls the first type of plasticizing process. Different from the second type of plasticizing process as described above, the mold opening process is started while the first type of plasticizing process is being performed. In other words, while the first type of plasticizing process is being performed, the mold unit 30 is opened.

In the first type of plasticizing process, the control unit 70 operates the injection motor 54 to move the screw 52 backward to form a space in front of the screw 52. Thereafter, the control unit 70 operates the plasticizing motor 53 to rotate the screw 52 while fixing the screw position and transfers the molding material in front of the screw 52.

In the first type of plasticizing process, the control unit 70 controls the plasticizing motor 53 such that the revolution speed of the screw 52 becomes a set value. The set value for the revolution speed of the screw 52 may be constant, or may be varied in accordance with a position of the screw 52 or in accordance with time period.

As the molding material is moved forward after the space is formed in front of the screw 52 in the first type of plasticizing process, almost no pressure is applied to the molding material in front of the screw 52. Thus, even when the mold opening process is started during the first type of plasticizing process, the molding material is prevented from flowing out from the cylinder 51.

In the first type of plasticizing process, the control unit 70 monitors the pressure of the molding material in front of the screw 52 by the pressure detector 55. When the pressure becomes greater than or equal to a predetermined value, it can be determined that a space in front of the screw 52 is filled with the molding material.

The screw position at the end of the first type of plasticizing process may be temporarily set as similarly as the screw position at the end of the second type of plasticizing process, and may be corrected in step S15, which will be explained later. Here, before the correction, the screw position at the end of the first type of plasticizing process may be set backward than the screw position at the end of the second type of plasticizing process, and is not specifically limited.

Here, although the control unit 70 starts rotating the screw 52 after moving the screw 52 backward in the first type of plasticizing process in this embodiment, the movement of the screw 52 in the backward direction and the rotation of the screw 52 may be repeatedly performed. Further, although it will be explained in detail later, the control unit 70 may rotate the screw 52 when moving the screw 52 backward. In the first type of plasticizing process, the pressure applied to the molding material in front of the screw 52 may be lower than a pressure that causes the molding material to flow out from the cylinder 51.

In step S14, a first type of filling process is performed. The control unit 70 controls the first type of filling process. In the first type of filling process, the control unit 70 operates the injection motor 54 to move the screw 52 forward and the molding material reserved in front of the screw 52 in the first type of plasticizing process is injected from the cylinder 51 to be filled in the mold unit 30. Here, in step S14, setting for the first type of filling process may be the same as the setting of the second type of filling process in step S12. The setting includes a moving speed of the screw 52 in the forward direction, the V/P switching position or the like. Thus, the moving speed of the screw 52 in the forward direction, the V/P switching position or the like of the first type of filling process in step S14 may be the same as that of the second type of filling process in step S12.

The control unit 70 monitors the pressure of the molding material in front of the screw 52 in the first type of filling process (hereinafter, simply referred to as the "pressure in the first type of filling process") by the pressure detector 55 and stores a monitored result (peak pressure T1, for example) in the storing unit. Alternatively, the control unit 70 may store the pressure at the V/P switching timing instead of the peak pressure, and the data to be stored may be various kinds. The control unit 70 may repeatedly perform the first type of plasticizing process and the first type of filling process for a plurality of shots, and may store an average value of the pressures of the plurality of shots in the storing unit.

Here, different from the second type of plasticizing process, almost no pressure is applied to the molding material in front of the screw 52 in the first type of plasticizing process. Thus, in the first type of plasticizing process, the density of the molding material in front of the screw 52 is lower than that in the second type of plasticizing process. Thus, correction of setting of the first type of plasticizing process is performed.

In step S15, the control unit 70 corrects a setting of the next first type of plasticizing process based on the pressure (peak pressure T1, for example) in the first type of filling process (in step S14) and the pressure (peak pressure T2, for example) in the second type of filling process (in step S12) such that the filling amount of the molding material in the mold unit 30 becomes the same. Specifically, the control unit 70 corrects the setting of the first type of plasticizing process such that the pressure in the first type of filling process becomes the same as the pressure in the second type of filling process. The setting to be corrected may include, for example, the screw position at the end of the first type of plasticizing process, the period of the first type of plasticizing process or the like. The pressures used for the correction may be the pressures at the V/P switching timing instead of the peak pressures.

When the screw position at the end of the first type of plasticizing process is moved backward, the amount of the molding material in front of the screw 52 increases and the pressure in the first type of filling process becomes large. On the other hand, when the screw position at the end of the first type of plasticizing process is moved forward, the amount of the molding material in front of the screw 52 decreases and the pressure in the first type of filling process becomes small.

When the period of the first type of plasticizing process is extended, the amount of the molding material in front of the screw 52 increases and the pressure in the first type of filling process becomes large. In order to extend the period of the first type of plasticizing process, the screw 52 is continuously rotated after the space in front of the screw 52 is filled with the molding material to an extent that the molding material does not leak from the cylinder 51. On the other hand, when the period of the first type of plasticizing process is shortened, the amount of the molding material in front of the screw 52 decreases and the pressure in the first type of filling process becomes small.

The relationship between the setting such as the screw position at the end of the first type of plasticizing process, the period of the first type of plasticizing process or the like, and the pressures (T1 and T2 themselves, the relationship of the magnitude of the pressures T1 and T2, the difference between the pressures T1 and T2 and/or the like, for example) in the first type of filling process and in the second type of filling process may be previously stored in the storing unit in a form of a table, an equation (formula) or the like, and may be used for correcting the setting of the first type of plasticizing process. The table or the equation may be generated by a test using an actual machine or a test device or by a simulation, and may be updated.

After correcting the setting of the first type of plasticizing process in step S15, the control unit 70 performs the first type of plasticizing process (step S16) and the first type of filling process (step S17) again. Here, in step S17, the pressure (peak pressure T1, for example) is monitored and stored in the storing unit.

Then, the control unit 70 determines whether a difference (absolute value) between the peak pressure T1 in the first type of filling process (in step S17) and the peak pressure T2 in the second type of filling process (in step S12) is within a predetermined value (step S18). The control unit 70 may repeat step S15 to step S18 until the difference becomes less than or equal to the predetermined value (YES in step S18).

Although the setting of the first type of plasticizing process is corrected by referring to data previously stored in the storing unit, the setting of the first type of plasticizing process may be corrected based on the relationship of the magnitude (large/small) of the pressure in the first type of filling process and the pressure in the second type of filling process (which of the pressures is smaller). For example, when the pressure (T1, for example) in the first type of filling process is smaller than the pressure (T2, for example) in the second type of filling process, the screw position at the end of the first type of plasticizing process is moved backward a predetermined amount in step S15. Then, step S16 and step S17 are performed. Thereafter, the relationship of the magnitude is evaluated again in next step S15 and if the relationship of the magnitude is not changed, the screw position at the end of the first type of plasticizing process is further moved backward for the predetermined amount. Meanwhile, if the relationship of the magnitude is changed, the screw position at the end of the first type of plasticizing process is moved forward for an amount less than the predetermined amount. The correction of the screw position at the end of the first type of plasticizing process is repeated until the difference between the pressure in the first type of filling process and the pressure in the second type of filling process becomes less than or equal to the predetermined value. Here, the correcting amount may gradually become small.

By performing the first type of plasticizing process and the first type of filling process using the corrected setting, a molding product having the same quality as that is obtained by performing the second type of plasticizing process and the second type of filling process can be obtained within a short period.

According to the first type of plasticizing process of the embodiment, an open and closing mechanism that opens and closes an exit of the cylinder 51 is unnecessary even when the mold opening process is started while the plasticizing process is being performed. In other words, the injection unit 50 of the embodiment may not include the open and closing mechanism. In such a case, a flow path of the molding material in the cylinder 51 can be made wider and shear heating of the molding material can be smaller compared with a case when the open and closing mechanism is provided, and thus the temperature of the molding material can be precisely controlled.

The control unit 70 may monitor the pressure in the first type of filling process when repeatedly performing the first type of plasticizing process and the first type of filling process using the corrected setting. The control unit 70 may correct the setting of the first type of plasticizing process based on the variance of the pressures of a plurality of shots of the first type of filling process in order to stabilize a quality of the molding product.

According to the embodiment, an injection molding machine capable of performing a plasticizing process at a mold open state by means other than an open and closing mechanism than an open and closing mechanism that opens and closes an exit of a cylinder is provided.

Although a preferred embodiment of the injection molding machine has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention.

For example, although it is described that the control unit 70 does not rotate the screw 52 when moving the screw 52 in the backward direction in the first type of plasticizing process, the screw 52 may be rotated. In such a case, the revolution speed of the screw 52 is set such that pressure is not applied to the molding material in front of the screw 52. Further in such a case, the screw 52 may be rotated in a direction by which the molding material is transferred forward. With this, the period necessary for the first type of plasticizing process can be further shortened.

Further, the order of the processes illustrated in FIG. 2 is not specifically limited. For example, step S13 (first type of plasticizing process) and step S14 (first type of filling process) may be performed prior to step S11 (second type of plasticizing process) and step S12 (second type of filling process).

What is claimed is:
1. An injection molding machine comprising:
a cylinder that heats a molding material;
a screw that is rotatably and reciprocatably provided in the cylinder;
a rotary driving unit that rotates the screw;
a reciprocation driving unit that reciprocates the screw;
a pressure detector that detects a pressure of the molding material reserved in front of the screw; and
a control unit that controls the rotary driving unit and the reciprocation driving unit,
the control unit including a memory that contains a program and a processor that is configured to execute the program so as to perform a method, said method including the steps of:
performing a first type of plasticizing process by moving the screw in a backward direction to a predetermined position and rotating the screw at the predetermined position to transfer the molding material forward to reserve the molding material in front of the screw while the screw is fixed at the predetermined position,
performing a first type of filling process by moving the screw forward to inject the molding material reserved in front of the screw to be filled in a mold unit,
monitoring the pressure in the first type of filling process by the pressure detector, and correcting a subsequent setting of the first type of plasticizing process,
wherein the method further includes, before the first type of plasticizing process and the first type of filling process,
    performing a second type of plasticizing process including the step of moving the screw in a longitudinal direction of the cylinder by rotating the screw to transfer the molding material forward to reserve the molding material in front of the screw while the screw is being moved backward to a predetermined position by the pressure caused by the molding material reserved in front of the screw,
    performing a second type of filling process by moving the screw forward to inject the molding material reserved in front of the screw in the second type of plasticizing process from the cylinder to be filled in the mold unit, and
    monitoring the pressure in the second type of filling process by the pressure detector, and
    wherein the control unit executes the program so as to perform the correcting step of the subsequent setting of the first type of plasticizing process based on a difference between the pressure monitored in the first type of filling process and the pressure monitored in the second type of filling process.

2. The injection molding machine according to claim 1, wherein the control unit executes the program so as to control the screw to be released and be rotated in a direction by which the molding material is transferred forward while controlling the screw to move in the backward direction to the predetermined position in the first type of plasticizing process.

3. The injection molding machine according to claim 1, wherein the control unit executes the program so as to correct the setting of the first type of plasticizing process based on a peak pressure.

4. The injection molding machine according to claim 1, wherein the control unit executes the program so as to correct the setting of the first type of plasticizing process based on pressure at timing when control of the screw is changed from velocity based control to pressure based control.

5. The injection molding machine according to claim 1, wherein the control unit executes the program so as to correct the setting of the first type of plasticizing process such that the difference between the pressure monitored in the first type of filling process and the pressure monitored in the second type of filling process becomes less than or equal to a predetermined value.

6. The injection molding machine according to claim 1, wherein the second type of plasticizing process is performed while the mold unit is not opened, and the first type of plasticizing process is performed while the mold unit is opened while the first type of plasticizing process is being performed.

7. The injection molding machine according to claim 1, wherein the control unit executes the program so as to store an average value of a plurality of pressures of the first type of filling process and an average value of a plurality of pressures of the second type of filling process in the memory and correct the subsequent setting of the first type of plasticizing process based on the average value of the first type of filling process and the second type of filling process.

* * * * *